L. W. DAUGHENBAUGH.
FASTENER FOR CAR DOORS.
APPLICATION FILED AUG. 25, 1913.
1,217,158.
Patented Feb. 27, 1917.
6 SHEETS—SHEET 1.
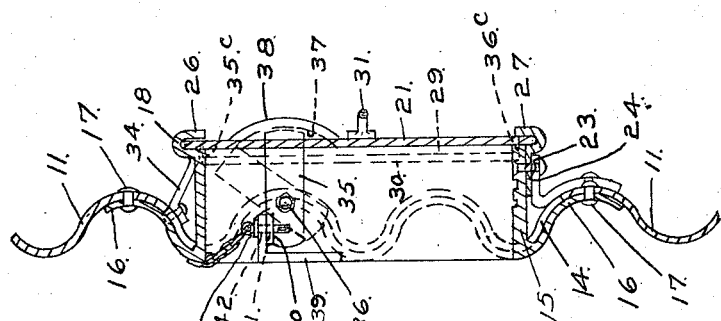
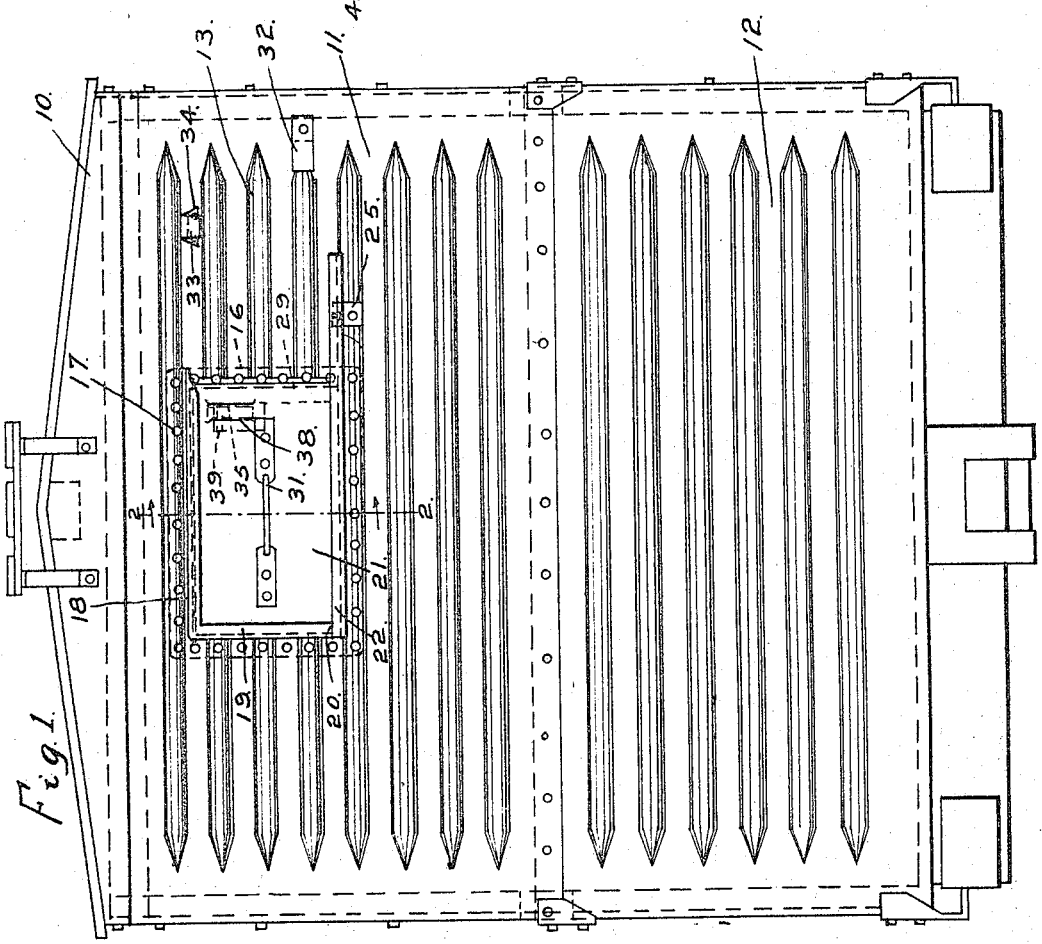
WITNESSES:
H. M. Gillespie
J. B. Lagorio
INVENTOR.
Lawrence W. Daughenbaugh
BY Barnett & Truman
ATTORNEYS

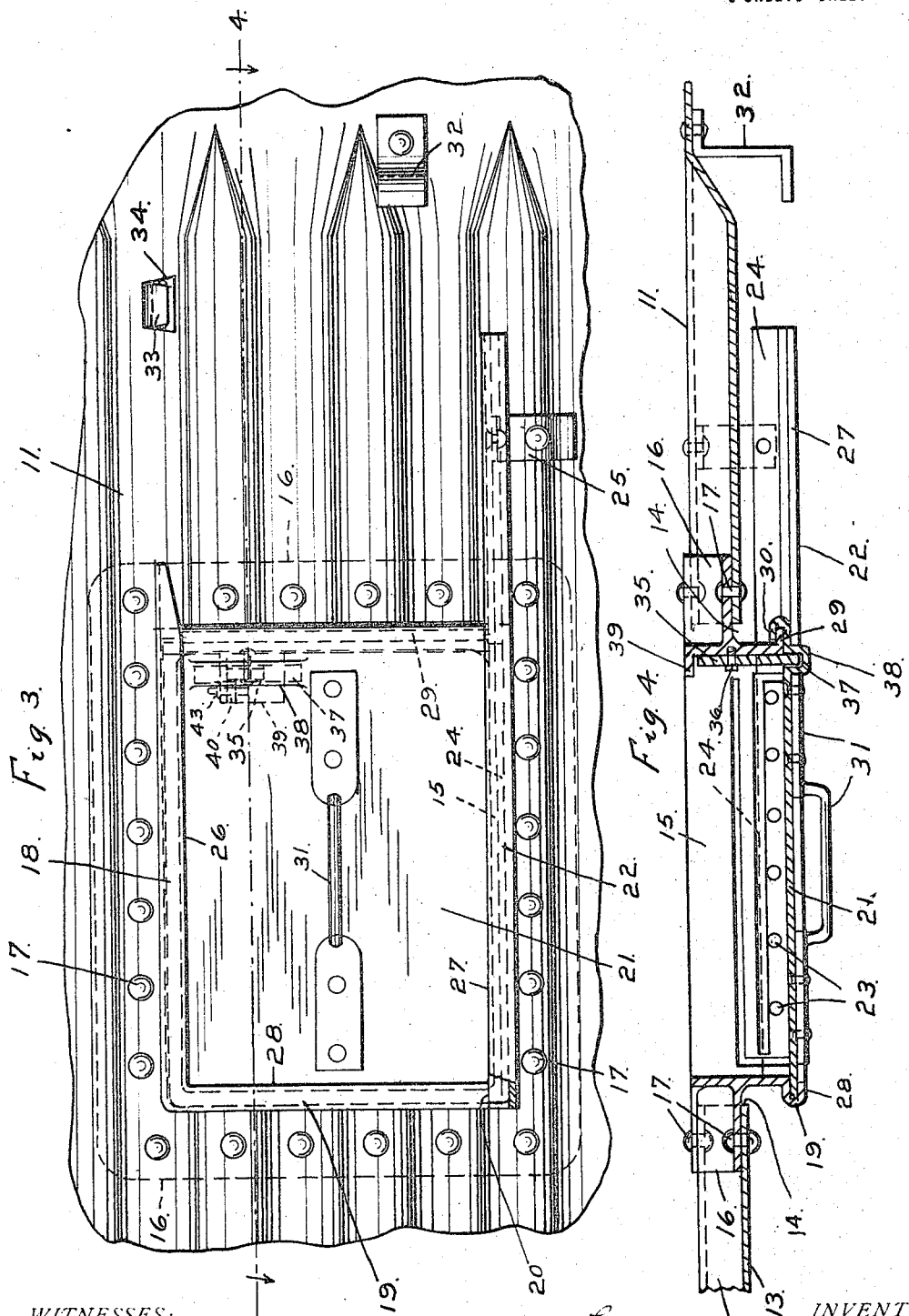

L. W. DAUGHENBAUGH.
FASTENER FOR CAR DOORS.
APPLICATION FILED AUG. 25, 1913.
1,217,158.
Patented Feb. 27, 1917.
6 SHEETS—SHEET 3.
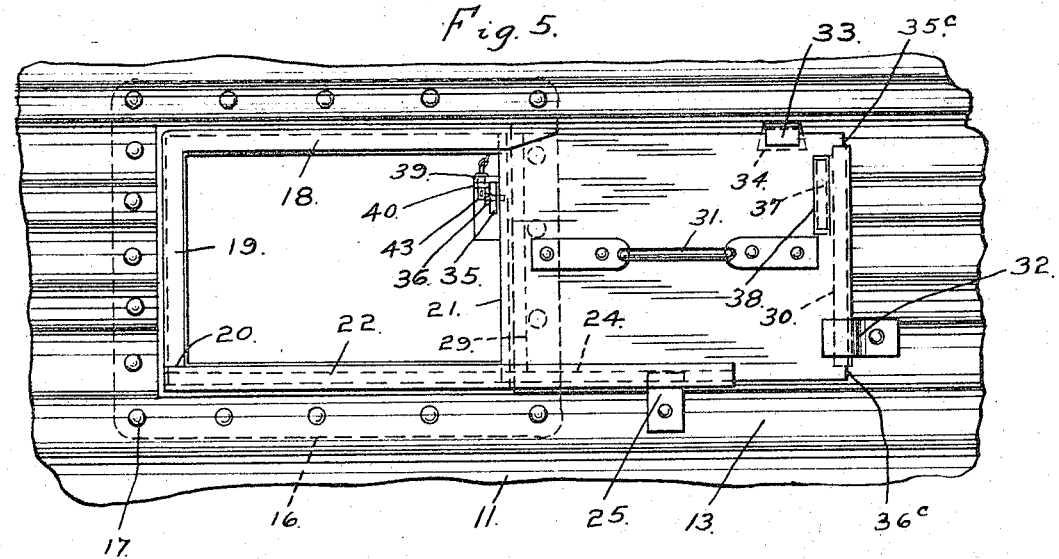
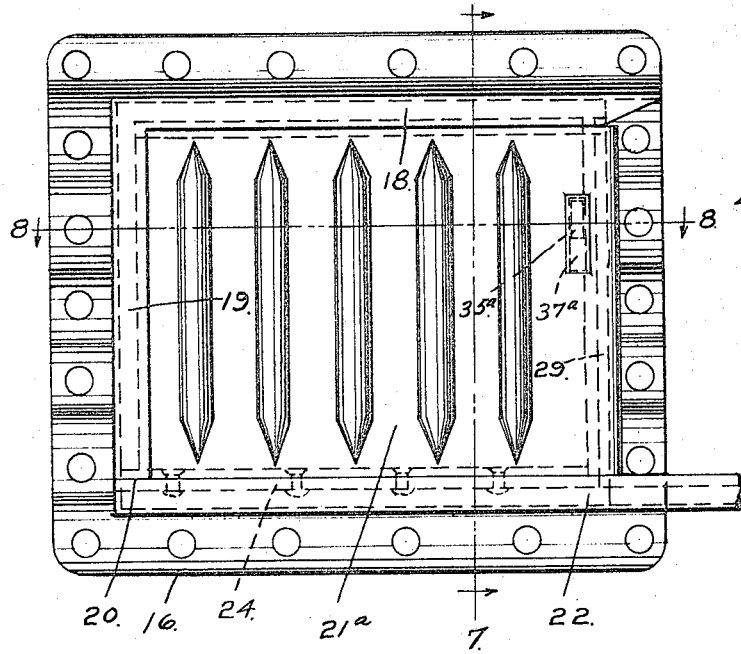
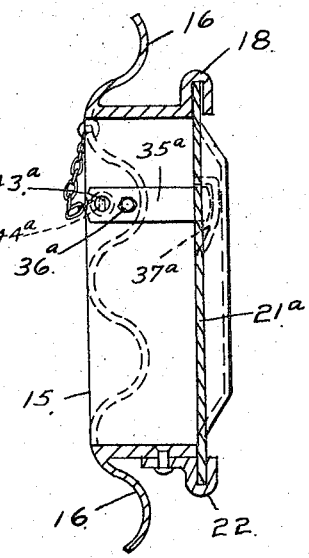
WITNESSES:
H. M. Gillespie
J. B. Lagorio
INVENTOR.
Lawrence W. Daughenbaugh
BY
Barwell & Truman
ATTORNEYS

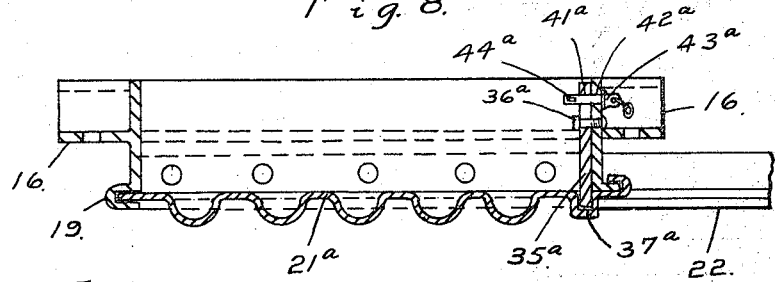
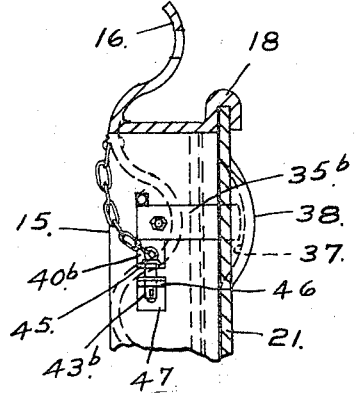
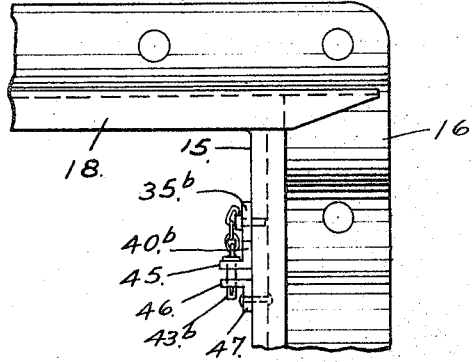

L. W. DAUGHENBAUGH.
FASTENER FOR CAR DOORS.
APPLICATION FILED AUG. 25, 1913.

1,217,158.

Patented Feb. 27, 1917.
6 SHEETS—SHEET 5.

WITNESSES:
H. M. Gillespie
J. B. Lagiro

INVENTOR.
Lawrence W. Daughenbaugh
BY
Barnett & Truman
ATTORNEYS

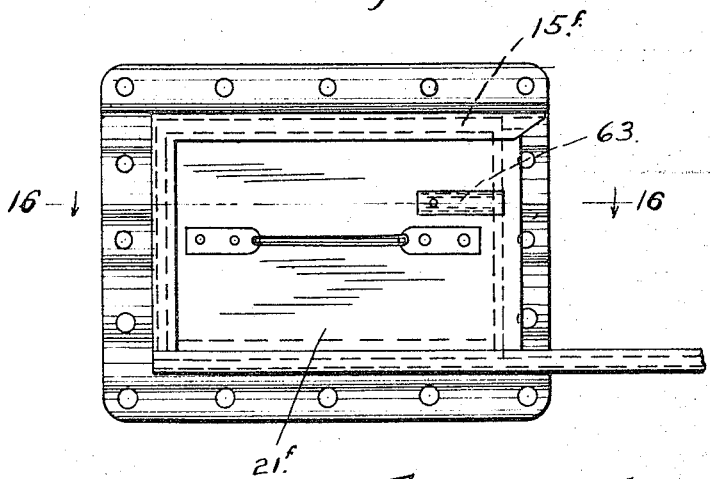
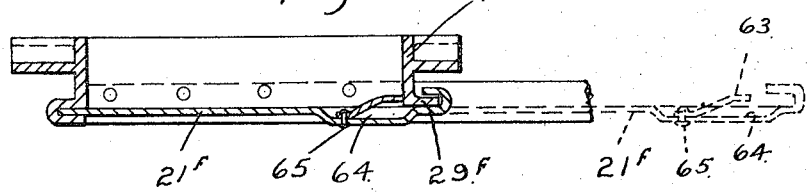
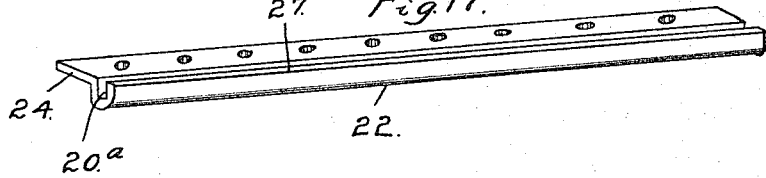

UNITED STATES PATENT OFFICE.

LAWRENCE W. DAUGHENBAUGH, OF CHICAGO, ILLINOIS, ASSIGNOR TO WALTER P. MURPHY, OF CHICAGO, ILLINOIS.

FASTENER FOR CAR-DOORS.

1,217,158.   Specification of Letters Patent.   Patented Feb. 27, 1917.

Application filed August 25, 1913.   Serial No. 786,453.

*To all whom it may concern:*

Be it known that I, LAWRENCE W. DAUGHENBAUGH, a citizen of the United States, residing at Chicago, in the county of Cook and State of Illinois, have invented certain new and useful Improvements in Fasteners for Car-Doors, of which the following is a specification.

My invention relates to a door for railway cars, more particularly to an end door of the sliding type; and the principal object of the invention is to provide a novel and improved fastening means for a railway car end door, releasable only from inside the car when the door is closed, which serves to hold the door either in the closed or open position, and in which the fastening element assumes its operative position automatically when the door is moved to be opened or closed.

My invention is illustrated in the accompanying drawings, in which similar characters of reference designate corresponding parts, and in which—

Figure 1 is an end elevation of a railway box car with my improved door applied thereto;

Fig. 2 is an enlarged sectional view taken on line 2—2 of Fig. 1, looking in the direction indicated by the arrows;

Fig. 3 is a fragmentary view, in elevation, of the car end showing my improved door in closed position;

Fig. 4 is a sectional plan view taken on line 4—4 of Fig. 3;

Fig. 5 is a view similar to Fig. 3, on a smaller scale, showing the door in its open position;

Fig. 6 is a view, in elevation, of a modified form of my improved door structure;

Figs. 7 and 8 are sectional views taken on lines 7—7 and 8—8, respectively, of Fig. 6.

Figure 11:
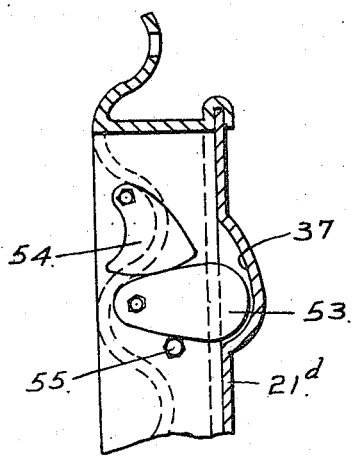
Figure 12:
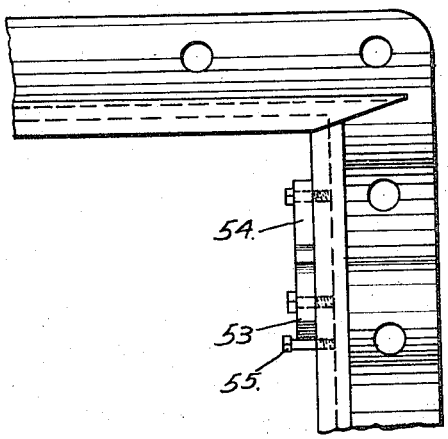
Figure 13:
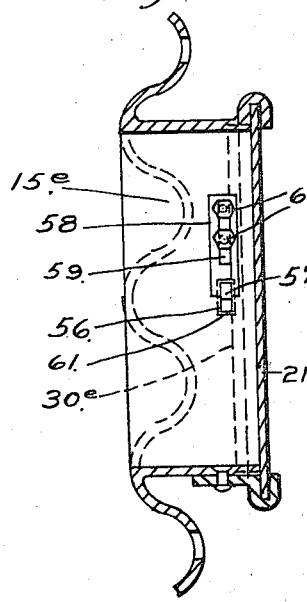
Figure 14:
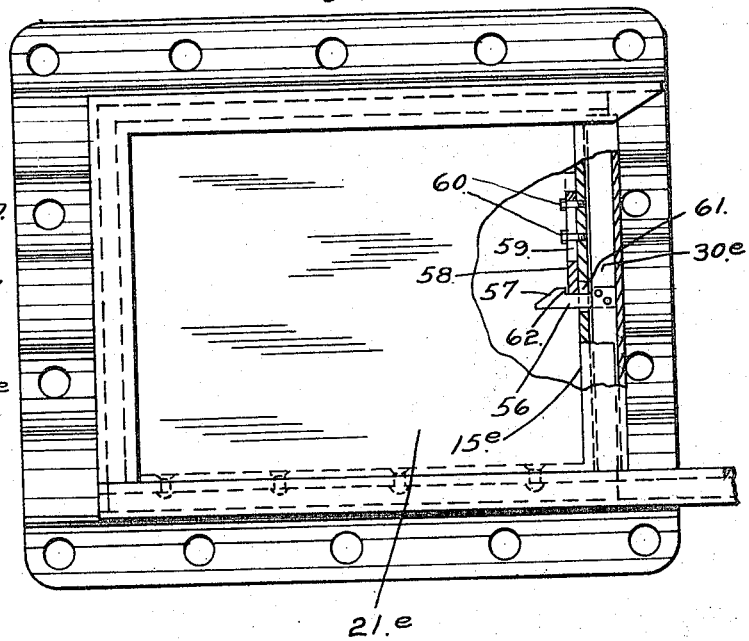

Fig. 9 is a vertical, cross-sectional view, taken through the upper part of the door and door frame, showing another form of locking means;

Fig. 10 is an elevation of the structure shown in Fig. 9 with the door removed;

Figs. 11 and 12 are views similar to Figs. 9 and 10, illustrating another modification;

Fig. 13 is a sectional view illustrating another modification;

Fig. 14 is a view, in elevation, of the door structure shown in Fig. 13, showing the locking device in section.

Fig. 15 is a view, in elevation, of the door, illustrating another modified form of locking device.

Fig. 16 is a sectional plan view taken on line 16—16 of Fig. 15.

Fig. 17 is a view, in perspective, of a guide member for the lower edge of the door.

Referring to the drawings, and particularly to Figs. 1 to 5, inclusive, and 17, thereof, 10 designates a railway box car provided with a sheet metal end composed of upper and lower end sheets 11 and 12. The upper sheet is provided with an aperture 14 in which is arranged a door frame 15. The door frame 15 is provided with a flange 16 which is secured to the inner face of the car end by rivets 17. The door frame is formed along the upper edge of the door opening with an inverted U-shaped guideway 18, which also extends down along one of its vertical edges as at 19 and terminates at the lower edge of the door opening as at 20. The door 21 is supported by the U-shaped guideway 22. The door 21 is preferably made of sheet metal and is slid back and forth in the U-shaped guideways 18 and 22, the lips 26 and 27 of which stand in front of the door at its upper and lower edges, respectively, while the lip 28 of the vertically extending U-shaped portion 19 stands in front of the forward edge of the door when closed. In order to close the space between the rear edge of the door and the frame, the frame is preferably formed at this point with a flange 29 over which the inwardly bent portion 30 of the door fits.

The door is provided with a handle 31 which extends across the door to points near its forward and rear edges. The outward movement of the door is limited by the door stop 32 which is secured to the car and extends outwardly so as to engage the rear edge of the door when the door is in its open position. When the door is in its open position, the U-shaped portion 33 of the guide member 34 engages the upper edge of the door so as to hold it in a vertical position and prevent it from sliding back and forth when the car is in motion. The bent portion 30 at the upper and lower edges of the door is preferably cut away as at 35° and 36° (shown best in Figs. 2 and 5) so as to permit it to pass between the flange 24 of the guideway 22 and the guide member 34.

The end doors of railway box cars, being usually near the top of the car, are somewhat unhandy for the trainmen, and by reason of this unhandy location the trainmen quite often slight their duties regarding it. It has been found that many trainmen do not take the trouble of closing and locking the end door when the cargo has been unloaded, and in many cases the door will be closed but not locked. When the car is running at the usual rate of speed it sways more or less from side to side. When the trainmen have neglected to lock the door, the swaying of the car causes the door to slide back and forth in its guideways and its striking against its stops causes considerable wear on its several parts, and within a short time require repairing or renewal of the parts. In order to avoid the above results, I have provided locking means that will automatically lock the door in either open or closed position. The locking device preferably comprises a gravity operating dog 35 pivoted to the inside of the door frame by means of a bolt 36 which, when in its operative position, when the door is closed, extends into a recess 37 formed by the corrugation 38. The downward movement of the dog is limited by the angular guard flange 39 which extends out from the door frame. The dog is formed with an outwardly extending portion 40 provided with an aperture 41 which registers with an aperture 42 in the angle 39. When it is desired to close the door the dog 35 is raised to the position shown by dotted lines in Fig. 2 and permitted to rest against the inner surface of the door. When the corrugation 38 in the door is moved to a position opposite the dog, the dog drops into the recess 37 and securely locks the door on the inside of the car. When it is desired to seal the door, a seal pin 43 is inserted in the apertures 41 and 42.

When opening the door, the dog 35 is raised to the position indicated by the dotted lines in Fig. 2 and the door slid outward. When the forward edge of the door passes the dog 35, the dog drops down in front of the door's edge and locks it in its open position, as shown in Fig. 5.

In Figs. 6 to 8, inclusive, I have shown the door 21ª provided with a locking device composed of a dog 35ª pivoted near its rear end by a bolt 36ª. In locking this form of door, the door is first slid to a closed position and the dog 35ª raised so that the forward end will extend into the recess 37ª formed in the door. When the pin has been raised to its operative position (shown best in Fig. 7) the seal pin 43ª is inserted through the apertures 41ª and 42ª in the dog and door frame, respectively, and a suitable seal inserted in the slot 44ª of the pin (Fig. 8).

Figs. 9 and 10 illustrate a locking device similar to the device shown in Figs. 1 to 5. In this device the downwardly extending portion 40$^b$ of the dog 35$^b$ is provided with an angular flange 45. A seal pin 43$^b$ extends vertically through apertures in the flange 45 of the dog 35$^b$ and the upper flange 46 of an angular bracket 47 secured to the side of the door frame. The application of the seal pin in this manner prevents it from becoming jarred out of its operative position.

In Figs. 11 and 12 the dog 53 extends into the recess 37$^d$ formed in the door 21$^d$ and is locked in its operative position by another gravity dog 54 having a cam surface which engages the upper edge of dog 53. The downward movement of the dog 53 is limited by a stop 55 screwed into the door casing. The locking device shown in these figures will prevent the locking dog 53 from being accidentally jarred out of its operative position.

The modification shown in Figs. 13 and 14 illustrates a locking device, in which the latch bar 56 is secured to the flange 30$^e$ at the rear end of the door 21$^e$ and is provided with an inclined surface 57. A drop latch 58 provided with a slot 59 is slidably secured to the door frame 15$^e$ by means of bolts 60. The door frame is provided with a small opening 61 below the latch 58. Upon closing the door the latch bar enters the opening 61 in the door frame and the inclined surface raises the latch 58 to the position shown in dotted lines (Fig. 14). When the door has reached its closed position the latch 58 drops down between the shoulder 62 of the latch bar 56 and the inner surface of the door frame.

The locking device shown in Figs. 15 and 16 comprises a spring 63 secured in the recess 64 of the door 21$^f$ by means of a rivet 65. When the door is moved from the open position indicated by the dotted lines in Fig. 16 to the closed position, the spring 63, when passing the flange 29$^f$ of the door frame 15$^f$, is pressed into the recess 64. When the door is in its closed position the spring 63 stands in the position shown in full lines in Fig. 16 so as to engage the door frame and prevent the door from being opened from the outside of the car.

I claim:

In an end door for railway cars, the combination with a door frame provided with a door opening, of guide-ways secured to said frame, a door slidably mounted in said guide-ways and provided on its inner surface with a recess adjacent its rearward edge, a gravity operated dog pivoted within the car to the rearward side of said frame so as not to be accessible from outside of the car when the said door is closed and adapted to drop into its operative position in said recess when the door is moved to its closed position, and to drop into the path of movement of the door when the door is opened, said guide-ways being formed to permit the door to slide rearwardly of the dog, and means for positively locking said dog in its operative position.

LAWRENCE W. DAUGHENBAUGH.

Witnesses:
HARRY W. STANNARD,
JOSEPHINE A. HARTNETT.